US010791449B2

(12) United States Patent
Hassan et al.

(10) Patent No.: US 10,791,449 B2
(45) Date of Patent: Sep. 29, 2020

(54) PROXIMITY DETECTION OF MOBILE DEVICES FOR VOIP CALLING

(71) Applicant: Microsoft Technology Licensing, LLC, Redmond, WA (US)

(72) Inventors: Amer A. Hassan, Kirkland, WA (US); Russell A. Penar, Highlands Ranch, CO (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 16/681,368

(22) Filed: Nov. 12, 2019

(65) Prior Publication Data
US 2020/0084609 A1 Mar. 12, 2020

Related U.S. Application Data

(63) Continuation of application No. 16/541,562, filed on Aug. 15, 2019, now Pat. No. 10,602,340, which is a (Continued)

(51) Int. Cl.
*H04M 7/00* (2006.01)
*H04W 8/00* (2009.01)
(Continued)

(52) U.S. Cl.
CPC .............. *H04W 4/90* (2018.02); *H04W 4/02* (2013.01); *H04W 4/023* (2013.01); *H04W 8/005* (2013.01); *H04M 7/006* (2013.01); *H04W 84/042* (2013.01)

(58) Field of Classification Search
CPC ...................................................... H04M 7/00
See application file for complete search history.

(56) References Cited

U.S. PATENT DOCUMENTS 7,643,618 B2    1/2010   Lass et al.
2007/0121798 A1* 5/2007 Croy .................. H04L 65/1069
                                                            379/37
(Continued)

FOREIGN PATENT DOCUMENTS

CN    101207664 A    6/2008
CN    101395937 A    3/2009
(Continued)

OTHER PUBLICATIONS

"Notice of Allowance Issued in U.S. Appl. No. 16/541,562", dated Dec. 11, 2019, 10 Pages.
(Continued)

*Primary Examiner* — Joshua L Schwartz
(74) *Attorney, Agent, or Firm* — Schwegman Lundberg & Lundberg, P.A.

(57) ABSTRACT

An initiating device receives a request to initiate a call to a service associated with a first identifier, wherein the identifier is associated with a first geographic location. A determination is then made as to whether a proxy device is in proximity to the initiating device, wherein the proxy device is configured to wirelessly communicate using a Voice Over Internet Protocol (VoIP). In response to the determination that the proxy device is in proximity to the initiating device, a determination is made for a second identifier for calling the service based on a second geographic location, wherein the second geographic location is associated with the proxy device, and the first identifier is replaced with the second identifier. The second identifier is then transmitted to the proxy device with an instruction to call the service. Thereafter, communications are performed via the proxy device.

20 Claims, 5 Drawing Sheets

Related U.S. Application Data continuation of application No. 16/356,274, filed on Mar. 18, 2019, now Pat. No. 10,433,148, which is a continuation of application No. 15/480,894, filed on Apr. 6, 2017, now Pat. No. 10,278,051.

(51) Int. Cl.
  *H04W 84/04* (2009.01)
  *H04W 4/90* (2018.01)
  *H04W 4/02* (2018.01)

(56) References Cited

U.S. PATENT DOCUMENTS

| | | | | |
|---|---|---|---|---|
| 2009/0163171 A1* | 6/2009 | Sporel | ............... | H04L 61/15 455/404.2 |
| 2015/0237469 A1* | 8/2015 | Stephens | ............ | H04M 3/42357 455/404.2 |
| 2016/0255483 A1* | 9/2016 | Parlamas | ............... | H04W 4/90 455/404.2 |
| 2017/0030994 A1* | 2/2017 | Meredith | ............... | H04W 4/90 |
| 2017/0156044 A1* | 6/2017 | Meredith | ............... | H04W 4/025 |

FOREIGN PATENT DOCUMENTS

| | | | |
|---|---|---|---|
| CN | 101601241 A | 12/2009 | |
| CN | 105120016 A | 12/2015 | |

OTHER PUBLICATIONS

"Office Action Issued in Chinese Patent Application No. 201880023426.5", dated Jun. 28, 2020, (w/ English Translation), 19 Pages.

* cited by examiner

PROXIMITY DETECTION OF MOBILE DEVICES FOR VOIP CALLING

CROSS-REFERENCE TO RELATED APPLICATION(S)

This application is a continuation of U.S. patent application Ser. No. 16/541,562, filed Aug. 15, 2019 and titled "PROXIMITY DETECTION OF MOBILE DEVICES FOR VOIP CALLING," which is a continuation of U.S. patent application Ser. No. 16/356,274, filed Mar. 18, 2019 and titled "PROXIMITY DETECTION OF MOBILE DEVICES FOR VOIP CALLING," which is a continuation of U.S. patent application Ser. No. 15/480,894, filed Apr. 6, 2017 and titled "PROXIMITY DETECTION OF MOBILE DEVICES FOR EMERGENCY CALLING," the disclosures of which are hereby incorporated by reference in their entirety.

BACKGROUND OF THE INVENTION

Reliability in making emergency calls is an important feature of any phone service. In the United States, emergency calls are handled through the 9-1-1 system, which originated in the era of landline telephones. The 9-1-1 system originally relied on the assumption that each phone is permanently present at a specific geographical location (e.g., a residential or business street address). The subsequent development of mobile calling devices has created technical hurdles to emergency calling. Because a mobile calling device can potentially make emergency calls from any location within a vast geographical area (e.g., at least the entire United States), additional steps beyond the connection of an emergency call itself are necessary to ensure that emergency services can be accurately dispatched to a caller's location.

Emergency services can be dispatched in response to an emergency call. A caller can initiate an emergency call (e.g., from a landline telephone, mobile phone, or other calling device) by dialing an emergency number (e.g., 9-1-1 in the United States). The emergency number connects the caller to an appropriate public-safety answering point ("PSAP") (e.g., a 9-1-1 dispatch center). The PSAP is selected on the basis of the caller's geographical location, as explained in more detail below. The caller is connected to an operator at the PSAP. Upon determining the nature of the emergency call, the operator dispatches appropriate emergency services to the caller's location if an emergency that requires a response by emergency services actually exists.

The selection of an appropriate PSAP is crucial because each PSAP is responsible for dispatching emergency services within a specific geographical area (e.g., a city or county), and a given PSAP can only directly dispatch emergency services to locations within its specific geographical area. When routing an emergency call to a PSAP, it is therefore essential that the selected PSAP is one whose geographical area of responsibility includes the caller's current location. Therefore, selecting an appropriate PSAP requires ascertaining the caller's geographical location. If a caller dialing 9-1-1 is connected to an inappropriate PSAP, the dispatcher at that PSAP will be powerless to help the caller even if the caller's geographical location is known. Even though a dispatcher at an inappropriate PSAP may know where the caller is dialing from by means of dialogue with the caller, the dispatcher is nonetheless unable to directly send emergency services to that location because the location is outside the PSAP's geographical area of responsibility. In an emergency situation, response times are crucial, and any delay can mean the difference between life and death.

For PSTN telephones, ensuring the selection of an appropriate PSAP is straightforward. Because a traditional PSTN telephone is necessarily associated with a specific geographical location, a phone company can create a record associating that traditional PSTN telephone with an appropriate PSAP. Emergency calls from that traditional PSTN telephone will be routed, according to that record, to the corresponding PSAP.

For mobile phones, the Enhanced 911 ("E911") system provides a standardized technological solution for routing emergency calls. When an emergency call is placed using a mobile phone with E911-compliant service, the phone's current location information is made available to the E911 system, which then selects an appropriate PSAP on the basis of that information. In practice, the location information is derived from Global Positioning System ("GPS") data supplied by the phone itself, cell-tower triangulation, or a combination thereof. Though E911 is not infallible, it is a generally reliable solution for handling emergency calls from mobile phones.

The increasing adoption of Voice over Internet Protocol ("VoIP") technology has introduced technological challenges beyond those currently addressed by E911. First, VoIP service is a so-called "over-the-top" ("OTT") service. The term "OTT" refers to any service whose data is transmitted as general network traffic over a preexisting Internet connection. The OTT nature of VoIP service limits the ability of an initiating device to ascertain its own geographical location. In general, an initiating device, when making a call, is "aware" only of the fact that an underlying network connection is available. Accordingly, the initiating device is "ignorant" of additional information concerning the network connection that could otherwise be useful in determining its geographical location. Such additional information may, for example, include the identity and geographical location of the cell tower supplying the network connection.

Second, while methods have been developed for tracking the location of certain initiating devices through measures that operate independently of VoIP service (e.g., separately maintained location records), those methods are subject to technological constraints that limit the circumstances in which reliable location information can be obtained. Consequently, mobile devices (e.g., laptop computers) often offer no emergency calling at all.

Emergency calling through VoIP is further complicated when initiating devices can be associated with phone numbers from the public switched telephone network ("PSTN"), as is the case in business-oriented VoIP services (e.g., Skype for Business™). For businesses, the availability of PSTN phone numbers is often desirable because an initiating device can keep the same PSTN phone number regardless of its actual geographic location. This, however, may lead to misrouted emergency calls. Because the E911 system cannot reliably distinguish between an initiating device with a PSTN phone number and a "true" PSTN device (e.g., a traditional PSTN telephone or mobile phone), the E911 system may be unable to correctly identify the geographical location of an initiating device.

For consumer-grade VoIP services (e.g., consumer Skype® service), the difficulties are even greater. Because such services generally do not associate user accounts with PSTN phone numbers, PSTN caller-identification systems cannot provide meaningful identification concerning the origin of a call from a consumer-oriented VoIP service. In practice, the "origin number" of a call made from a consumer-oriented VoIP account may be an "unknown caller" indication, an arbitrary PSTN phone number with no relationship to the caller, or a series of digits that do not constitute a valid PSTN phone number (e.g., "000-000-0000"). If an emergency call is made from a consumer-oriented VoIP account, the E911 system will be unable to route the call to the appropriate PSAP.

Without a way to accurately determine the geographical origin of a VoIP-based emergency call, the call may be disconnected, routed to an incorrect PSAP, or routed to an inappropriate phone line within a PSAP (e.g., an administrative phone line, as opposed to a phone line connecting to 911 dispatchers).

VoIP services have generally addressed the problem of emergency calling by associating each initiating device with a registered location. As a practical matter, the registered location of an initiating device is usually defined in advance of using the device (e.g., immediately upon the activation of VoIP service). While a registered location can, in principle, be any location to which emergency services can be dispatched, a registered location is typically a home address (if the initiating device is for personal use) or an office address (if the initiating device is for business use). Emergency calling from the initiating device is enabled only when the device is confirmed to be present at its registered location. The registered location of a VoIP desk phone, for instance, may be the street address of the office building in which the phone is located. When an emergency call is placed from the phone, the location of the phone may be confirmed in various ways (e.g., by verifying that the phone is connected to a specific corporate network). If the confirmed location of the phone matches the registered location, the emergency call is allowed to proceed. Otherwise, the emergency call should be "blocked" (i.e., disconnected). The use of registered locations ensures that any initiating device that successfully places an emergency call is known to be present at a specific geographical location (i.e., the initiating device's registered location) to which emergency services should be dispatched.

The use of registered locations can be especially limiting for mobile devices (e.g., smartphones). By specifying a registered location from which a mobile device can place VoIP emergency calls, a registered location effectively forces the mobile device to function as a PSTN telephone for the purposes of emergency calling.

An additional source of complication is the pending adoption of text-based modes of communicating with emergency dispatchers (e.g., "Text-to-911" functionality). As a practical matter, many VoIP calling programs (e.g., Skype®) are capable of sending text messages. As in the case of an emergency call, emergency services cannot be dispatched in response to a text message unless the geographical origin of that text message can be determined.

Accordingly, there is a need for a system and method to allow initiating devices to request emergency services from any location an emergency call can be made or a text message requesting emergency services can be sent.

BRIEF SUMMARY OF THE INVENTION

The present invention provides a way to place a call from an initiating device capable of placing VoIP calls, such as a tablet computer, by routing the call through a proximate (i.e., nearby) proxy device, such as a smartphone. The proximate device can comprise a cellular-enabled device.

The initiating device can receive an initiation of a call via a VoIP calling application. The initiating device can detect a failure of the call and confirm a proximity within a range of a proxy device to the initiating device. Upon confirming the proximity within a range of the proxy device, the initiating device can route the call through the proxy device.

In some cases, in an emergency, a user of an initiating device may attempt to place an emergency call (e.g., to 9-1-1) through the initiating device. The initiating device, however, may be unable to place the call because of a lack of Wi-Fi® or other network connectivity or the blocking of VoIP-based or other network-based emergency calls under an information technology ("IT") or other policy. An IT policy may specify, for instance, that a VoIP-based emergency call should be blocked when an initiating device cannot be confirmed to be present at its registered location. Upon the failure of an attempted VoIP-based emergency call, the initiating device emits a discovery signal to determine whether a paired proxy device is proximate. If the proxy device is proximate, the initiating device directs the proxy device to initiate the emergency call. If the proxy device successfully places an emergency call, the user may speak with PSAP dispatcher through the proxy device. Alternatively, the initiating device may join the emergency call, allowing the user to speak with the PSAP dispatcher without switching devices.

In one embodiment, this disclosure provides a method of routing a call through a proxy device associated with an initiating device, the method comprising receiving, by an initiating device, a request to initiate a call to a service associated with a first identifier, wherein the identifier is associated with a first geographic location and determining whether a proxy device is in proximity to the initiating device, wherein the proxy device is configured to wirelessly communicate using a Voice Over Internet Protocol (VoIP). In response to the determination that the proxy device is in proximity to the initiating device, the method also includes determining a second identifier for calling the service based on a second geographic location, wherein the second geographic location is associated with the proxy device, replacing the first identifier with the second identifier, transmitting the second identifier to the proxy device with an instruction to call the service, and communicating with the service via the proxy device.

In another embodiment of the method, the method further comprises determining that the initiating device has failed to establish the call, wherein the determining whether the proxy device is in proximity to the initiating device is in response to the failure of the initiating device to communicate with the service.

In a further embodiment of the method, replacing the first identifier with the second identifier is based on a determination that the second identifier is different than the first identifier.

In yet another embodiment of the method, the first geographic location is a first country and the second geographic location is a second country, and the first identifier for calling the service in the first country is different from the second identifier for calling the service in the second country.

In yet a further embodiment of the method, the initiating device determines the first geographic location by querying for location information from at least one source, and inferring the first geographic location from the results of the query.

In another embodiment of the method, determining whether the proxy device is in proximity to the initiating device comprises transmitting a discovery signal to the proxy device, and receiving a reply signal from the proxy device.

In a further embodiment of the method, the proxy device is a first proxy device of a plurality of proxy devices in proximity with the initiating device, and each proxy device of the plurality of proxy devices is associated with a corresponding priority value, the priority value indicating a ranking of the corresponding proxy device. The method also includes determining which proxy device of the plurality of proxy devices to use in placing the call based on the priority value associated with the corresponding proxy device, and selecting the first proxy device to place the call based on the determination that the priority value of the first proxy device is higher ranked than the other priority values associated with the other proxy devices of the plurality of proxy devices.

This disclosure also describes an initiating device for calling a service via a proxy device in proximity to the initiating device, wherein the initiating device comprises one or more processors, and a memory device storing machine-readable instructions that, when executed by the one or more processors, configure the initiating device to perform a plurality of operations. The plurality of operations includes receiving a request to initiate a call using a first identifier, wherein the first identifier is associated with a first geographic location, and determining whether a proxy device is in proximity to the initiating device, wherein the proxy device is configured to wirelessly communicate using a Voice Over Internet Protocol (VoIP). In response to the determination that the proxy device is in proximity to the initiating device, the plurality of operations also includes determining a second identifier for calling the service based on a second geographic location, wherein the second geographic location is associated with the proxy device, replacing the first identifier with the second identifier, transmitting the second identifier to the proxy device with an instruction to call the service, and communicating with the service via the proxy device.

In another embodiment of the initiating device, the plurality of operations further comprises determining that the initiating device has failed to establish the call, and wherein the determining whether the proxy device is in proximity to the initiating device is in response to the failure of the initiating device to communicate with the service.

In a further embodiment of the initiating device, the plurality of operations further comprises replacing the first identifier with the second identifier based on a determination that the second identifier is different than the first identifier.

In yet another embodiment of the initiating device, the first geographic location is a first country and the second geographic location is a second country, and the first identifier for calling the service in the first country is different from the second identifier for calling the service in the second country.

In yet a further embodiment of the initiating device, the plurality of operations further comprises the initiating device determining the first geographic location by querying for location information from at least one source, and inferring the first geographic location from the results of the query.

In another embodiment of the initiating device, determining whether the proxy device is in proximity to the initiating device comprises transmitting a discovery signal to the proxy device, and receiving a reply signal from the proxy device.

In a further embodiment of the initiating device, the proxy device is a first proxy device of a plurality of proxy devices in proximity with the initiating device, and each proxy device of the plurality of proxy devices is associated with a corresponding priority value, wherein the priority value indicates a ranking of the corresponding proxy device. In addition, the plurality of operations further comprises determining which proxy device of the plurality of proxy devices to use in placing the call based on the priority value associated with the corresponding proxy device, and selecting the first proxy device to place the call based on the determination that the priority value of the first proxy device is higher ranked than the other priority values associated with the other proxy devices of the plurality of proxy devices.

This disclosure further describes a storage device having machine-readable instructions stored thereon that, when executed by one or more processors, configure an initiating device to perform a plurality of operations. The plurality of operations includes receiving, by an initiating device, a request to initiate a call using a first identifier, wherein the first identifier is associated with a first geographic location and determining whether a proxy device is in proximity to the initiating device, wherein the proxy device is configured to wirelessly communicate using a Voice Over Internet Protocol (VoIP). In response to the determination that the proxy device is in proximity to the initiating device, the plurality of operations includes determining a second identifier for calling the service based on a second geographic location, wherein the second geographic location is associated with the proxy device, replacing the first identifier with the second identifier, transmitting the second identifier to the proxy device with an instruction to call service, and communicating with the service via the proxy device.

In another embodiment of the storage device, the plurality of operations further comprises determining that the initiating device has failed to establish the call, and determining whether the proxy device is in proximity to the initiating device is in response to the failure of the initiating device to communicate with the service.

In a further embodiment of the storage device, replacing the first identifier with the second identifier is based on a determination that the second identifier is different than the first identifier.

In yet another embodiment of the storage device, the first geographic location is a first country and the second geographic location is a second country, and the first identifier used to call the service in the first country is different from the second identifier used to call the service in the second country.

In yet a further embodiment of the storage device, the plurality of operations further comprises the initiating device determining the first geographic location by querying for location information from at least one source, and inferring the first geographic location from the results of the query In another embodiment of the storage device, the proxy device is a first proxy device of a plurality of proxy devices in proximity with the initiating device, and each proxy device of the plurality of proxy devices is associated with a corresponding priority value, the priority value indicating a ranking of the corresponding proxy device. In addition, the plurality of operations includes determining which proxy device of the plurality of proxy devices to use in placing the call based on the priority value associated with the corresponding proxy device, and selecting the first proxy device to place the call based on the determination that the priority value of the first proxy device is higher ranked than the other priority values associated with the other proxy devices of the plurality of proxy devices.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Other features and advantages will become apparent from the following more detailed description, taken in conjunction with the accompanying drawings, which illustrate, by way of example, the principles of the invention.

BRIEF DESCRIPTION OF DRAWINGS

The various present embodiments now will be discussed in detail with an emphasis on highlighting the advantageous features with reference to the drawings of various embodiments. The illustrated embodiments are intended to illustrate, but not to limit the invention. These drawings include the following figures, in which like numerals indicate like parts.

DETAILED DESCRIPTION OF THE INVENTIONS

Figure 1A:
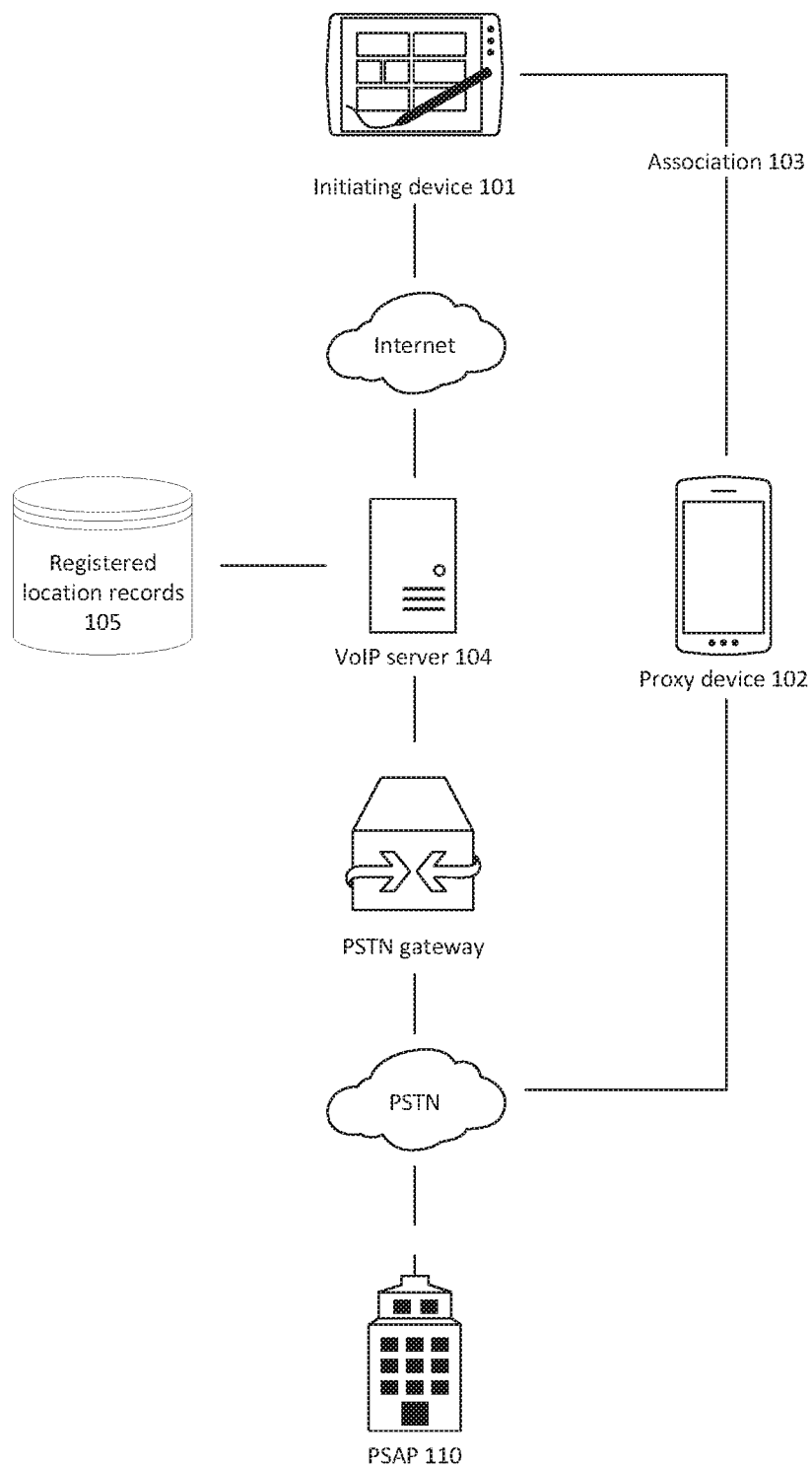
FIG. 1A shows the relationship between an initiating device, a proxy device, and a PSAP.

The following detailed description describes present embodiments with reference to the drawings. In the drawings, reference numbers label elements of present embodiments. These reference numbers are reproduced below in connection with the discussion of the corresponding drawing features.

As a preliminary note, any of the embodiments described with reference to the figures may be implemented using software, firmware, hardware (e.g., fixed logic circuitry), or a combination of these implementations. The terms "logic." "module," "component," "system" and "functionality," as used herein, generally represent software, firmware, hardware, or a combination of these elements. For instance, in the case of a software implementation, the terms "logic," "module," "component," "system," and "functionality" represent program code/instructions that performs specified tasks when executed on a processing device or devices (e.g., CPU, CPUs or processor(s)). The program code can be stored at locations in one or more computer readable memory devices such as random access memory, disc drives or their equivalents.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a single processing device), or may be distributed over a plurality of locations and interconnected by a network.

The term "machine-readable media" and the like refers to any kind of non-transitory medium for retaining information in any form, including various kinds of storage devices (magnetic, optical, static, etc.). Machine-readable media also encompasses transitory forms for representing information, including various hardwired and/or wireless links for transmitting the information from one point to another.

The embodiments disclosed herein, may be implemented as a computer process (method), a computing system, or as an article of manufacture, such as a computer program product or non-transitory computer-readable media. The computer program product may be computer storage media, readable by a computer device, and encoding a computer program of instructions for executing a computer process. The computer program product may also be a propagated signal on a carrier wave, readable by a computing system, and encoding a computer program of instructions for executing a computer process.

The systems and processes described below are applicable and useful in the upcoming cloud computing environment. Cloud computing pertains to computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to the Internet and cloud computing allows shared resources, for example, software and information, to be available, on-demand, like a public utility.

Typical cloud computing providers deliver common business applications online, which are accessed from another web service or software like a web browser, while the software and data are stored remotely on servers. The cloud computing architecture uses a layered approach for providing application services. The lowest layer is an application layer that is executed on client computers. In this example, the application allows a client to access cloud storage. Above the application layer is a cloud platform and cloud infrastructure, including a "server" layer that includes hardware and computer software designed for cloud-specific services.

Referring to FIG. 1A, an embodiment of the invention may be part of an initiating device 101. The initiating devices 101 can include, without limitation, tablet computers, personal computers, laptop computers (e.g., a Microsoft Surface® product) or the like. More generally, an initiating device 101 may be any device capable of placing VoIP calls through an Internet connection. By way of illustration but not limitation, the initiating device 101 may be a desktop computer, smartphone, or smart watch running or accessing a VoIP calling program (e.g., Skype for Business™ software) or an analog telephone with an attached VoIP adapter. The initiating device 101 need not have "built-in" or "preconfigured" VoIP functionality. A laptop computer may require a user to separately download and install a VoIP calling program before VoIP calls can be placed. Once the appropriate VoIP calling program is installed, however, the laptop computer becomes an initiating device. The initiating device 101 is not precluded from having additional forms of network connectivity that allow for phone calls. By way of illustration but not limitation, the initiating device 101 may be a smartphone running as a default cellular-network phone app in addition to a VoIP-calling app.

An initiating device 101 is associated ("paired") with a proxy device 102. A person skilled in the art will recognize that device-pairing functionality may be provided by an underlying technological standard (e.g., Wi-Fi Direct® or Bluetooth®). In a typical usage scenario, a proxy device 102 may be a smartphone. More generally, the proxy device 102 may be any device capable of placing emergency calls through the E911 system. By way of illustration but not limitation, proxy device 102 may be cellular-enabled and therefore capable of placing emergency calls through a cellular network (e.g., a 3G or 4G network), such as a tablet computer or smart watch with built-in support for cellular networks. The proxy device 102 may be capable of sending a text message (e.g., via Short Message Service) directed to an emergency number. The proxy device 102, however, need not have "built-in" or "preconfigured" connectivity to a cellular network. By way of illustration but not limitation, the proxy device 102 may be a laptop computer equipped with a mobile broadband adapter.

The initiating device 101 and the proxy device 102 are associated (or paired) with one another, such that the devices 101, 102 are connected in manner that allows either device to readily confirm the identity of the other device. Association 103 of the devices 101, 102 may be provided by the device-pairing functionality of Wi-Fi Direct® technology. By way of illustration but not limitation, device-pairing may be achieved using Wi-Fi Protected Access 2—Pre-Shared Key (conventionally called "WPA2-PSK" or "WPA2 Personal") technology. More generally, association 103 may be provided by any technology that supports device pairing (e.g., Bluetooth® or near-field communication. The association 103 between the devices 101, 102 may also be provided by a custom pairing technology. A custom pairing technology may be desirable where either the initiating device 101 or the proxy device 102 (or both devices 101, 102) does not support a standardized method of pairing. Such may be the case, for instance, if proxy device 102 is a feature phone with no built-in support for Wi-Fi Direct®, Bluetooth®, or near-field communication. A custom pairing technology may require one or both of the initiating device 101 and the proxy device 102 to have additional attached hardware (e.g., a dongle). The proxy device 102 is capable of establishing a connection 104 to a PSAP 110.

In practice, the initiating device 101 may connect, through the Internet, to a VoIP server 104 operated by the provider of a VoIP calling service (e.g., Skype®). The VoIP server 104 may optionally be capable of accessing a set of registered location records 105. The VoIP server 104 may be connected to a PSTN gateway, which is in turn connected to the PSTN, through which the PSAP 110 can be reached. A person skilled in the art will recognize that the VoIP server 104 and the registered location records 105 may be implemented on a cloud computing platform.

Figure 1B:
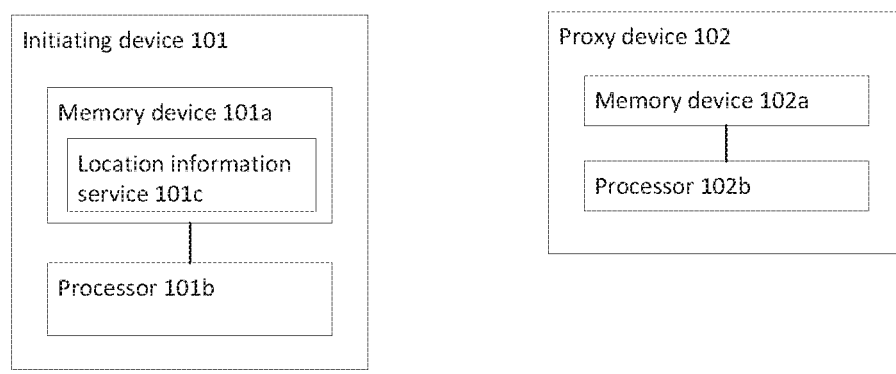
FIG. 1B is a schematic diagram showing components of an initiating device and a proxy device.

Referring to FIG. 1B, the initiating device 101 includes a memory device 101a. The memory device 101a may be any form of non-volatile storage. By way of illustration but not limitation, the memory device 101a may be a flash memory (e.g., in a smartphone or tablet computer), a magnetic hard drive (e.g., in a laptop or desktop computer), or the like. The memory device 101a need not be an integral or "built-in" component of the initiating device 101. By way of illustration but not limitation, the memory device 101a may be a removable memory card (e.g., a Secure Digital memory card), a USB flash drive, or a removable hard drive. The memory device 101a contains machine-readable instructions, which direct the processor 101b to carry out the steps needed to cause an attempted emergency call to be routed from the initiating device 101 to the proxy device 102 (steps 210-240). The memory device 101a may additionally contain machine-readable instructions constituting a location information service 101c.

The initiating device 101 has a processor 101b. The processor 101b is coupled to the memory device 101a, such that the processor 101b can access and execute machine-readable instructions stored on the memory device 101a. The processor 101b may be designed for use in a variety of devices including, but not limited to, a smartphone or tablet computer (e.g., a Qualcomm® or ARM® processor) or for use in a laptop or desktop computer (e.g., an Intel® or AMD® processor).

Figure 1C:
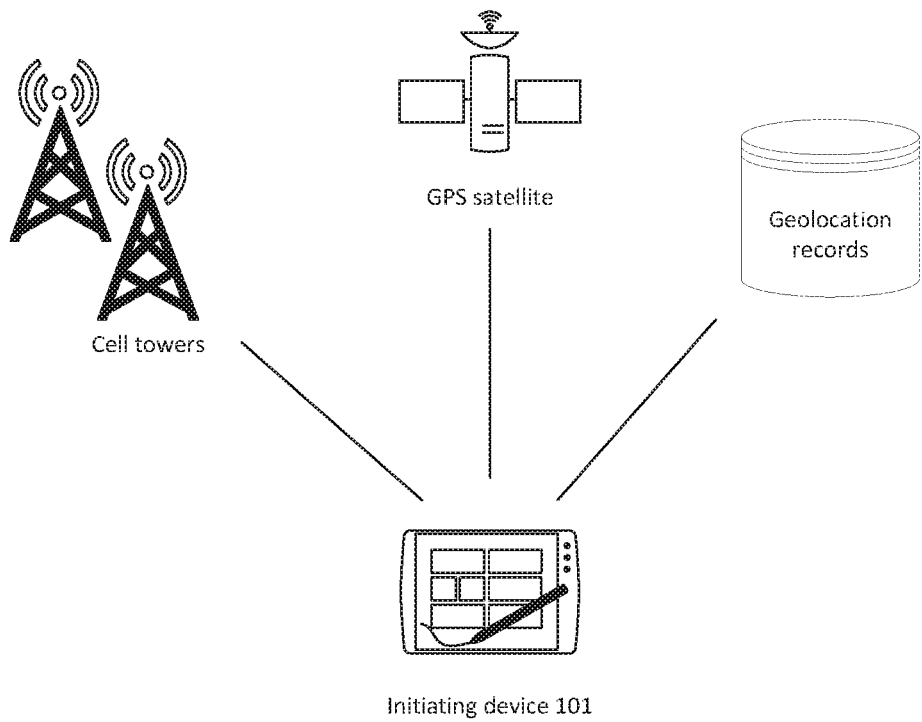
FIG. 1C shows the relationship between an initiating device and sources of location information.

Referring to FIG. 1C, the initiating device 101 may communicate with a variety of sources of location information. As shown in FIG. 1C, the initiating device may obtain location information from a cell tower (i.e., through cell-tower triangulation), a GPS satellite, or from a set of geolocation records (i.e., by associating an IP address with an estimated geographical location). A person skilled in the art will recognize that the specific combination of sources reachable by the initiating device 101 at any particular time may vary. If an initiating device 101 is located in a basement, for instance, the initiating device 101 will typically lack the ability to communicate with any cell tower or any GPS satellite. In practice, an initiating device 101 may obtain location information from multiple sources of the same type. Cell-tower triangulation, for example, requires the initiating device 101 to communicate with at least two cell towers. In addition to GPS satellites, an initiating device 101 may also obtain information from the GLONASS satellite system (i.e., the Russian equivalent of GPS). An initiating device 101 may obtain location information from more than one set of geolocation records.

Figure 2A:
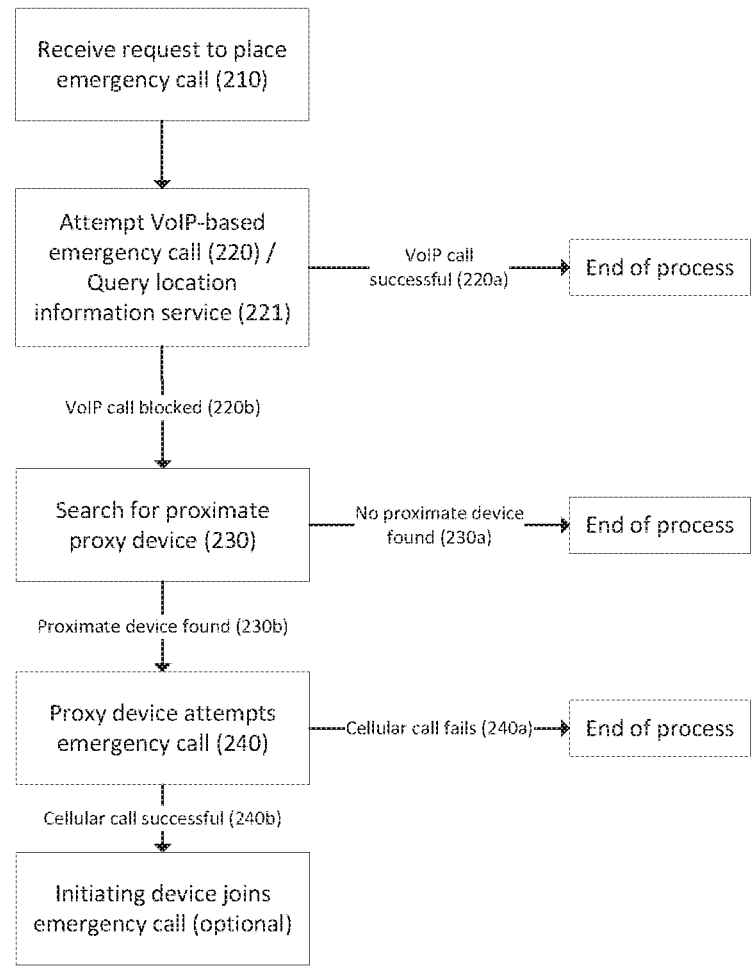
FIG. 2A is a flowchart depicting a process by which an initiating device directs a proxy device to place an emergency call.

Referring to FIG. 2A, the process for initiating an emergency call from an initiating device 101 begins when the initiating device 101 receives a request to place an emergency call through VoIP (step 210). The request in step 210 may occur when a user of the initiating device 101 dials an emergency number (e.g., "911") or otherwise directs the initiating device 101 to initiate an emergency call (e.g., by tapping an "Emergency Call" button on a user interface). Alternatively, step 210 may by triggered by an automated system. By way of illustration but not limitation, a "smart watch" could trigger step 210 upon the activation of an emergency-calling feature. The initiating device 101 then attempts to place an emergency call through VoIP (step 220). If the VoIP emergency call is connected (outcome 220a), then the user of the initiating device 101 is connected to a PSAP, and the process ends.

The attempted VoIP emergency call in step 220, however, may be unsuccessful. The call may fail because of a lack of VoIP connectivity. Such may be the case, for instance, if initiating device 101 cannot receive a Wi-Fi® or cellular signal of sufficient strength. Alternatively, the initiating device 101 may lack the authorization to communicate over any networks that are reachable. The initiating device 101, for instance, may lack the credentials to access a secured Wi-Fi® network. Alternatively, the initiating device 101 may be prevented by a data cap from transmitting VoIP data over a cellular network.

The attempt in step 220 may also fail if VoIP emergency calling is disabled for administrative reasons. An information technology ("IT") policy, for instance, may specify that VoIP emergency calling is disabled ("blocked") when the initiating device 101 cannot be confirmed to be present at a registered location. Such blocking is useful in preventing the initiating device 101 from causing emergency services to be dispatched on the basis of inaccurate information. In practice, the blocking of emergency calls from initiating devices may be required by law or regulation. The attempt of step 220 may optionally include the querying of a location information service (step 221) to determine whether the initiating device 101 is present at a registered location.

A registered location may be a street address (e.g., a residence) or other defined geographical area (e.g., a corporate campus). The initiating device 101 may determine whether it is present within a registered location by inferring its current geographic location and comparing the inferred location with the registered location. The inferred location may be determined using location data obtained by the initiating device 101. By way of illustration but not limitation, the inferred location may be coordinates from the Global Positioning System ("GPS"), Internet Protocol ("IP") geolocation information, positional data from cell-tower triangulation, or a combination thereof. The inferred location need not correspond exactly to the precise geographic location of the initiating device 101 to enable a determination of whether the initiating device 101 is present within a registered location. For example, the registered location of the initiating device 101 may be the headquarters of Microsoft (i.e., One Microsoft Way, Redmond, Wash. 98052). If the initiating device 101 is located at the Microsoft Technology Center in New York City (i.e., 11 Times Square, New York, N.Y. 10036), IP geolocation information may indicate "New York City" (without a street address) as the inferred location of the initiating device 101. The fact that IP geolocation information would not pinpoint the whereabouts of the initiating device 101 by street address does not prevent the initiating device 101 from concluding that it is outside its registered location. The fact that the inferred location is "New York City" is sufficient for the initiating device 101 to conclude that it is outside its registered location.

Figure 2B:
FIG. 2B is a schematic diagram showing an inferred geographical location that is ambiguous with respect to a registered location.
Figure 2C:
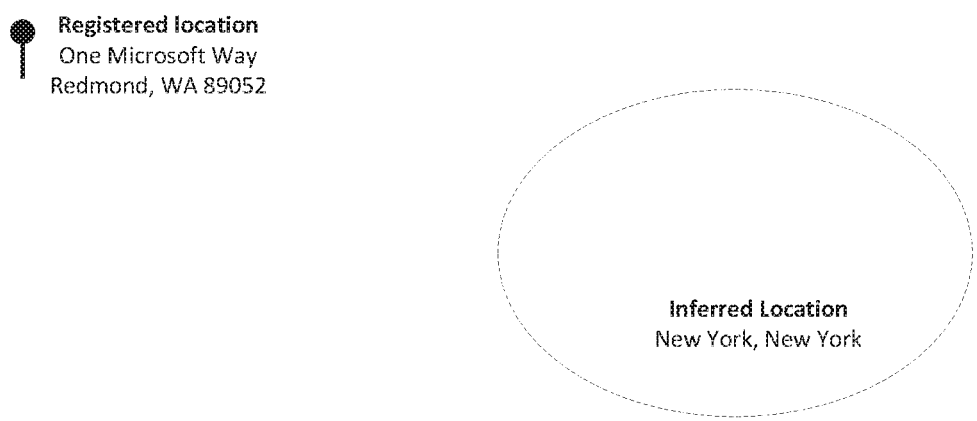
FIG. 2C is a schematic diagram showing an inferred geographical location that is not ambiguous with respect to a registered location.

FIGS. 2B and 2C illustrate the distinction between an ambiguous inferred location and a non-ambiguous inferred location. In both FIG. 2B and FIG. 2C, an initiating device 101 has a registered location at One Microsoft Way, Redmond, Wash. 89052. In FIG. 2B, the inferred location of the initiating device 101 is Redmond, Wash. Such may be the case if the user of the initiating device 101 is somewhere within the city limits of Redmond, Wash., and the initiating device 101 obtains the inferred location on the basis of IP geolocation information. Because the inferred location in FIG. 2B encompasses the registered location (i.e., One Microsoft Way) as well as geographical locations outside the registered location (i.e., elsewhere in Redmond, Wash.), the inferred location does not contain enough information to make a determination of whether the initiating device 101 is present at, or absent from, the registered location. In FIG. 2C, by contrast, the inferred location is New York, N.Y. Because geographical region encompassed by the inferred location is also the registered location, the initiating device can conclude that it is outside the registered location.

A person skilled in the art will recognize that some usage cases may require the geographical location of the initiating device 101 to be known with greater detail. In the foregoing example, the initiating device 101 may instead be located in downtown Redmond, Wash., which is outside the device's registered location. IP geolocation may indicate "Redmond, Wash." as the current location of the initiating device 101. In that case, the IP geolocation information is insufficient to determine whether the initiating device 101 is indeed within its registered location. Since the reported location of "Redmond, Wash." may correspond to the registered location (i.e., One Microsoft Way) or some other location (e.g., downtown Redmond), there is no basis for concluding whether the initiating device 101 is in a registered location. In this case, additional information, such as GPS coordinates, may be needed to reach the correct determination. A person skilled in the art will recognize that the various methods of determining the location of the initiating device 101 may be combined to reach an accurate determination of whether the initiating device 101 is outside its registered location.

In some cases, the initiating device 101 may be unable to determine its current geographical location with sufficient accuracy to determine whether the device is within a registered location. Such may be the case if the initiating device 101 completely lacks connectivity to sources of location information. If the initiating device 101 is located in a basement, for instance, it may simultaneously lack Wi-Fi® connectivity, cellular connectivity, and visibility of GPS satellites. Alternatively, the initiating device 101 may find itself in circumstances where the only available location information (e.g., IP geolocation information) is ambiguous. A person skilled in the art will recognize that when the initiating device 101 cannot reach a determination as to whether it is present within a registered location, it is prudent to deem the device to be outside the registered location.

In practice, the initiating device 101 may obtain information concerning its own geographical location from a location information service. A location information service may be an application programming interface ("API") that provides a uniform set of software commands for retrieving location information from disparate sources and for determining whether the initiating device 101 is away from a registered location. A location information service may prioritize sources of location information. By way of illustration but not limitation, a location information service may first attempt to determine the geographical location of the initiating device 101 by retrieving GPS coordinates. If GPS coordinates cannot be obtained (e.g., because of a lack of visible GPS satellites), the location information service may then attempt to obtain IP geolocation information. A location information service may combine location information from multiple sources, so as to determine the geographical location of the initiating device 101 with greater accuracy than would be feasible with only information from any single source. Such an approach is particularly useful where high-accuracy sources of location information (e.g., GPS) are unavailable.

Following the failure of the attempted VoIP emergency call (outcome 220*b*), the initiating device 101 may ascertain the proximity of a proxy device 102 (step 230). To determine whether the proxy device 102 is proximate to itself, the initiating device 101 transmits a wireless discovery signal. The discovery signal may contain information specifically identifying the proxy device 102 as the desired respondent, or it may non-specifically request a response from any proxy device that receives the signal. If the proxy device 102 is within range of the discovery signal, the proxy device 102 transmits a wireless reply signal. The wireless reply signal contains information confirming that the proxy device 102 is paired with the initiating device 101. The initiating device 101 may estimate the physical distance between itself and the proxy device 102 by measuring the strength of the reply signal. Since the reply signal weakens with increasing distance between the two devices, the initiating device 101 may define a minimum signal strength ("threshold strength") as an indicator of proximity. If the strength of the reply signal is above the threshold strength, the proxy device 102 is considered to be proximate to the initiating device 101; otherwise, the proxy device 102 is not proximate. The proxy device 102 may, for instance, transmit the discovery signal at a power of 1.0 milliwatt (mW). A person skilled in the art will recognize that the signal strengths may conventionally be expressed in decibel-milliwatts (dBm). Where decibel-milliwatts are used, a signal strength of 1 mW equates to 0 dBm. Signal strengths greater than 1 mW will equate to positive dBm values, and signal strengths weaker than 1 mW will equate to negative dBm values. A person skilled in the art will recognize that it may be advisable for the initiating device 101 to require the reply signal from the proxy device 102 to equal or exceed a threshold strength.

A person skilled in the art will recognize that the strength of the reply signal may be affected by environmental factors, such as the presence of physical obstacles (e.g., walls or ceilings) between the initiating device 101 and the proxy device 102. Therefore, the same strength of reply signal, when received by the initiating device 101, may not always correspond to the same physical distance between the initiating device 101 and the proxy device 102.

A person skilled in the art will recognize that the initiating device 101 may confirm the proximity of the proxy device 102 by decoding at least one specific network packet from the proxy device 102. By way of illustration but not limitation, the decoded network packet may constitute a Transmission Control Protocol message, such as an a SYN-ACK message from the proxy device 102. A person skilled in the art will recognize that the ability to decode at least one network packet from the proxy device 102 generally suffices to confirm the proximity of the proxy device 102, without any additional need to determine the strength of the reply signal in milliwatts or decibel-milliwatts. This approach is advantageous because the wireless technology by which the devices 101, 102 communicate may vary in maximum range. Bluetooth®, for instance, has a maximum range of 10 meters while near-field communication has a maximum range of 20 centimeters.

The proxy device 102 may periodically transmit a reply signal regardless of whether the initiating device 101 has transmitted a discovery signal. The periodical transmission of a reply signal allows the initiating device 101 to monitor the proximity of the proxy device 102 on an ongoing basis, thereby obviating the need to determine such proximity when a user of the initiating device 101 attempts to contact an emergency number. By way of illustration but not limitation, the proxy device 102 may transmit a reply signal once every second.

The Bluetooth® low energy version of the Bluetooth® standard is particularly suited for proximity detection. Because Bluetooth® low energy significantly reduces battery consumption while maintaining the same wireless range as older versions of Bluetooth® technology, it allows the devices 101, 102 to engage in proximity detection without excessively draining the battery of either device. Bluetooth® low energy, in addition, is expected to be available in more than 90% of Bluetooth®-enabled devices (e.g., tablet computers and smartphones) and to therefore enjoy near-ubiquitous support among mobile devices.

Wi-Fi Direct®, however, has some technological advantages over Bluetooth® low energy, such as greater range support for more-sophisticated security measures. Where Wi-Fi Direct® provides proximity detection, the proxy device 102 may be configured to have the status of a Group Owner ("GO") in accordance with Wi-Fi® technological standards. GO status allows the proxy device 102 to act as an access point and to broadcast a Service Set Identifier ("SSID") (i.e., a wireless network name) and to make itself easily identifiable by the initiating device 101. A person skilled in the art will recognize that a Wi-Fi® access point periodically broadcasts "beacon frame" signals, which identify the existence and capabilities of that access point to all other Wi-Fi® devices within its range. A beacon frame includes a so-called "information element," which can include information such as the SSID associated with the access point. Where the proxy device 102 acts as a Wi-Fi® access point, the proxy device 102 may additionally be configured to indicate in the information elements of its beacon frames that it is available to contact emergency numbers. A person skilled in the art will recognize that in addition to beacon frames, a Wi-Fi® access point is capable of broadcasting other types of "frame" signals, including "action frame" signals. An action frame may direct a receiving device to take a particular action. Thus, when the initiating device 101 receives a request to contact an emergency number and is unable to confirm that it is present in a registered location, the initiating device 101 can transmit an action frame to the proxy device 102, which directs the proxy device 102 to contact the emergency number. These features may make Wi-Fi Direct® preferable to Bluetooth® low energy in specific usage scenarios.

If the proxy device 102 is not proximate to the initiating device 101 (outcome 230a), then the process ends with no emergency call placed. The initiating device 101 may alert the user, via an error message, that no emergency call can be placed.

If the proxy device 102 is proximate to the initiating device 101 (outcome 203b), then the initiating device 101 directs proxy device 202 to initiate an emergency call (step 240). The initiating device 101 may wirelessly transmit the emergency number to be dialed (e.g., "911") to the proxy device 102. The initiating device 101 may automatically select an emergency number to be dialed by the proxy device 102 on the basis of the inferred location of the proxy device 101. In the European Union, for instance, the emergency number is 112 instead of 911. If an emergency arises when the initiating device 101 is being used in the European Union, a United States-based user may not be aware that 112, is the appropriate emergency number and may dial 911 instead. In this case, the initiating device 101 may automatically replace 911 with 112 when directing the proxy device 102 to initiate an emergency call. Alternatively, the initiating device 101 may show a message on a user interface directing the user to dial an appropriate emergency number using the proxy device 102 (e.g., "Dial 911 on your mobile phone.").

The proxy device 102 may not be able to place the emergency call (outcome 240a). This may be the case if the proxy device 102 is unable to connect to any cell tower. In that event, the process ends and no emergency call is placed. The proxy device 102 may transmit a signal to the initiating device 101 indicating this fact, and the initiating device 101 may in turn alert the user, via an error message, that no emergency call can be placed.

If the proxy device 102 successfully places the emergency call (outcome 240b), then the user may speak to the PSAP dispatcher using proxy device 102. Alternatively, the initiating device 101 may connect to the emergency call (e.g., through Wi-Fi Direct®), allowing the user to take part in the emergency all without switching devices. If the initiating device 101 joins the emergency call, the initiating device 101 may capture audio and transmit that audio to the proxy device 102 (e.g., through Bluetooth®, Wi-Fi Direct®, or near-field communication). The proxy device 102 then transmits the audio through the PSTN to the PSAP 110. Audio from the PSAP 110 is transmitted, in the reverse direction, through the proxy device 102 to the initiating device 101.

A person skilled in the art will recognize that the steps for placing an emergency call in FIG. 2 can be applied to text-message requests for emergency service. Where a user of the initiating device 101 requests emergency services through a text message, the text message may be considered equivalent to an emergency call.

In some cases, the initiating device 101 and proxy device 102 may constitute a single physical device ("combined device"). Such may be the case if, for instance, for a smartphone running both a PSTN calling app (e.g., the default "phone" app) and a VoIP calling app (e.g., Skype for Business™). In the case of a combined device, searching for a proximate device (step 230) may consist of verifying that a PSTN calling app is available on the device.

In some cases, the proxy device 102 may also constitute an initiating device. Such may be the case, for instance, if the proxy device 102 is a smartphone running a VoIP calling app (e.g., Skype for Business™). In this case, the proxy device 102 may initiate a call using its own VoIP calling app.

While the initiating device 101 is paired with a single proxy device 102 in a typical usage scenario, the initiating device 101 may be associated with multiple proxy devices. Such may be the case, for instance, if a user carries separate mobile phones for personal and business use. The initiating device 101 may be configured to prioritize multiple proxy devices 102. The initiating device 101, for instance, may first determine whether a business mobile phone is proximate. If the business mobile phone is not proximate, the initiating device 101 may then determine whether a personal mobile phone is proximate. The initiating device 101 may be configured to place an emergency call through the highest-priority proxy device 102 that is proximate.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the disclosure to achieve one or more of the desired objects or results.

The numerical values mentioned for the various physical parameters, dimensions or quantities are only approximations and it is envisaged that the values higher/lower than the numerical values assigned to the parameters, dimensions or quantities fall within the scope of the disclosure, unless there is a statement in the specification specific to the contrary.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the subject matter has been described in language specific to structural features and/or methodological acts, it is to be understood that the subject matter defined in the claims that follow is not necessarily limited to the specific features or acts described above. Rather, the specific features and acts described above are disclosed as example forms of implementing the claims.

What is claimed is:

1. A method of routing a call through a proxy device associated with an initiating device, the method comprising:
   receiving, by an initiating device, a request to initiate a call to a service associated with a first identifier, wherein the identifier is associated with a first geographic location;
   determining whether a proxy device is in proximity to the initiating device, wherein the proxy device is configured to wirelessly communicate using a Voice Over Internet Protocol (VoIP);
   in response to the determination that the proxy device is in proximity to the initiating device:
      determining a second identifier for calling the service based on a second geographic location, wherein the second geographic location is associated with the proxy device;
      replacing the first identifier with the second identifier;
      transmitting the second identifier to the proxy device with an instruction to call the service; and
      communicating with the service via the proxy device.

2. The method of claim 1, further comprising determining that the initiating device has failed to establish the call; and
   wherein the determining whether the proxy device is in proximity to the initiating device is in response to the failure of the initiating device to communicate with the service.

3. The method of claim 1, wherein:
   replacing the first identifier with the second identifier is based on a determination that the second identifier is different than the first identifier.

4. The method of claim 1, wherein:
   the first geographic location is a first country and the second geographic location is a second country; and
   the first identifier for calling the service in the first country is different from the second identifier for calling the service in the second country.

5. The method of claim 1, wherein the initiating device determines the first geographic location by:
   querying for location information from at least one source; and
   inferring the first geographic location from the results of the query.

6. The method of claim 1, wherein determining whether the proxy device is in proximity to the initiating device comprises:
   transmitting a discovery signal to the proxy device; and
   receiving a reply signal from the proxy device.

7. The method of claim 1, wherein:
   the proxy device is a first proxy device of a plurality of proxy devices in proximity with the initiating device; and each proxy device of the plurality of proxy devices is associated with a corresponding priority value, the priority value indicating a ranking of the corresponding proxy device; and the method further comprises:

determining which proxy device of the plurality of proxy devices to use in placing the call based on the priority value associated with the corresponding proxy device; and selecting the first proxy device to place the call based on the determination that the priority value of the first proxy device is higher ranked than the other priority values associated with the other proxy devices of the plurality of proxy devices.

8. An initiating device for calling a service via a proxy device in proximity to the initiating device, the initiating device comprising:

one or more processors; and a memory device storing machine-readable instructions that, when executed by the one or more processors, configure the initiating device to perform a plurality of operations comprising:

receiving a request to initiate a call using a first identifier, wherein the first identifier is associated with a first geographic location;

determining whether a proxy device is in proximity to the initiating device, wherein the proxy device is configured to wirelessly communicate using a Voice Over Internet Protocol (VoIP);

in response to the determination that the proxy device is in proximity to the initiating device:

determining a second identifier for calling the service based on a second geographic location, wherein the second geographic location is associated with the proxy device;

replacing the first identifier with the second identifier:

transmitting the second identifier to the proxy device with an instruction to call the service; and communicating with the service via the proxy device.

9. The initiating device of claim 8, wherein the plurality of operations further comprises determining that the initiating device has failed to establish the call; and wherein the determining whether the proxy device is in proximity to the initiating device is in response to the failure of the initiating device to communicate with the service.

10. The initiating device of claim 8, wherein the plurality of operations further comprises:

replacing the first identifier with the second identifier based on a determination that the second identifier is different than the first identifier.

11. The initiating device of claim 10, wherein:

the first geographic location is a first country and the second geographic location is a second country; and the first identifier for calling the service in the first country is different from the second identifier for calling the service in the second country.

12. The initiating device of claim 8, wherein the plurality of operations further comprises the initiating device determining the first geographic location by:

querying for location information from at least one source; and inferring the first geographic location from the results of the query.

13. The initiating device of claim 8, wherein determining whether the proxy device is in proximity to the initiating device comprises:

transmitting a discovery signal to the proxy device; and receiving a reply signal from the proxy device.

14. The initiating device of claim 8, wherein:

the proxy device is a first proxy device of a plurality of proxy devices in proximity with the initiating device; and each proxy device of the plurality of proxy devices is associated with a corresponding priority value, the priority value indicating a ranking of the corresponding proxy device; and the plurality of operations further comprise:

determining which proxy device of the plurality of proxy devices to use in placing the call based on the priority value associated with the corresponding proxy device; and selecting the first proxy device to place the call based on the determination that the priority value of the first proxy device is higher ranked than the other priority values associated with the other proxy devices of the plurality of proxy devices.

15. A storage device having non-transitory machine-readable instructions stored thereon that, when executed by one or more processors, configure an initiating device to perform a plurality of operations comprising:

receiving, by an initiating device, a request to initiate a call using a first identifier, wherein the first identifier is associated with a first geographic location;

determining whether a proxy device is in proximity to the initiating device, wherein the proxy device is configured to wirelessly communicate using a Voice Over Internet Protocol (VoIP);

in response to the determination that the proxy device is in proximity to the initiating device:

determining a second identifier for calling the service based on a second geographic location, wherein the second geographic location is associated with the proxy device;

replacing the first identifier with the second identifier;

transmitting the second identifier to the proxy device with an instruction to call service; and communicating with the sendee via the proxy device.

16. The storage device of claim 15, wherein the plurality of operations further comprises determining that the initiating device has failed to establish the call; and wherein the determining whether the proxy device is in proximity to the initiating device is in response to the failure of the initiating device to communicate with the service.

17. The storage device of claim 15, wherein:

replacing the first identifier with the second identifier is based on a determination that the second identifier is different than the first identifier.

18. The storage device of claim 17, wherein:

the first geographic location is a first country and the second geographic location is a second country; and the first identifier used to call the service in the first country is different from the second identifier used to call the service in the second country.

19. The storage device of claim 15, wherein the plurality of operations further comprises the initiating device determining the first geographic location by:

querying for location information from at least one source; and inferring the first geographic location from the results of the query.

20. The storage device of claim 15, wherein:
the proxy device is a first proxy device of a plurality of proxy devices in proximity with the initiating device; and
each proxy device of the plurality of proxy devices is associated with a corresponding priority value, the priority value indicating a ranking of the corresponding proxy device; and
the plurality of operations further comprises:
  determining which proxy device of the plurality of proxy devices to use in placing the call based on the priority value associated with the corresponding proxy device; and
  selecting the first proxy device to place the call based on the determination that the priority value of the first proxy device is higher ranked than the other priority values associated with the other proxy devices of the plurality of proxy devices.

* * * * *